F. ZALESKI.
MACHINE FOR MAKING COMPOSITE INSOLES.
APPLICATION FILED JUNE 21, 1917.

1,265,579.

Patented May 7, 1918.
5 SHEETS—SHEET 1.

Inventor.
Frank Zaleski
by Heard Smith & Tennant
Attys.

F. ZALESKI.
MACHINE FOR MAKING COMPOSITE INSOLES.
APPLICATION FILED JUNE 21, 1917.

1,265,579.

Patented May 7, 1918.
5 SHEETS—SHEET 3.

Inventor.
Frank Zaleski
by Heard Smith & Tennant.
Attys.

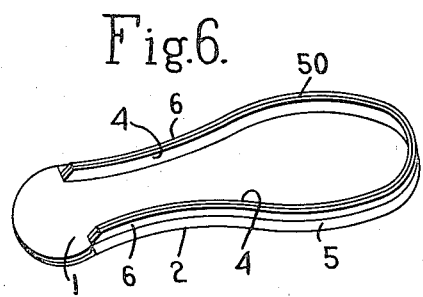
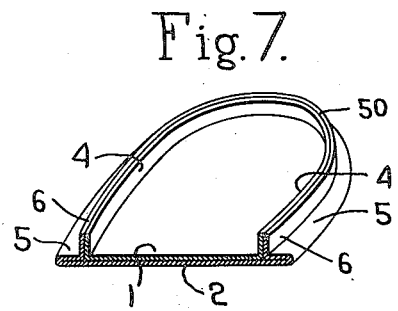
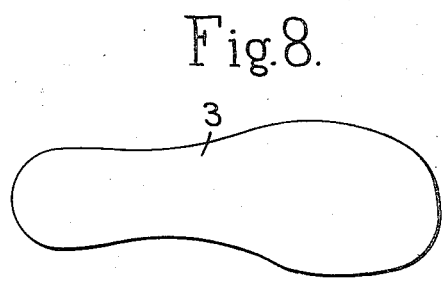
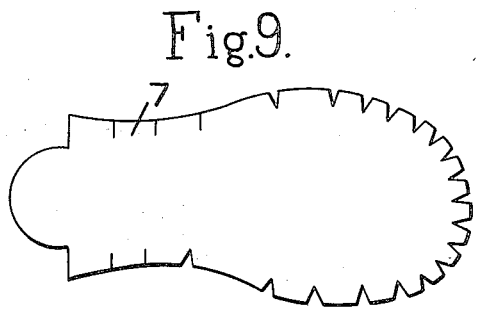
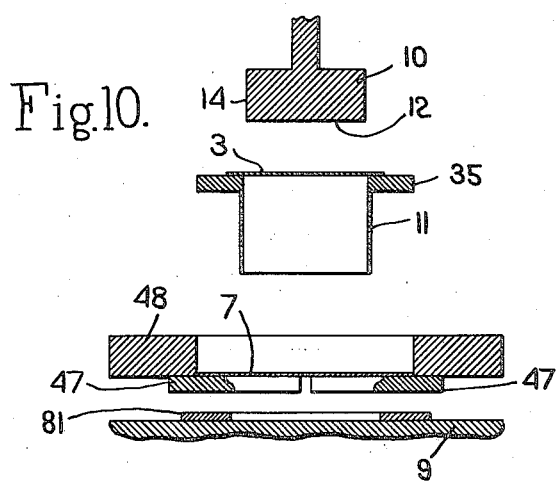

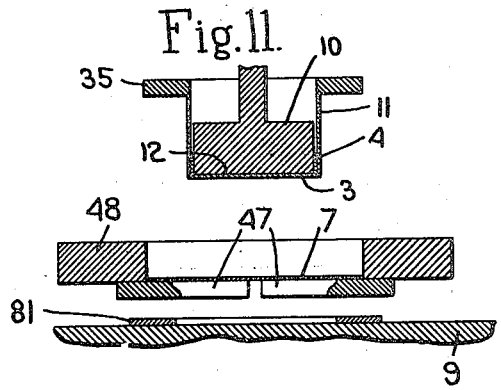
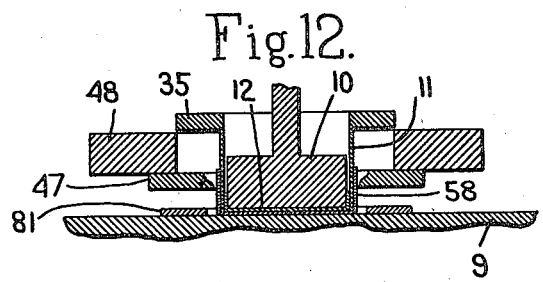
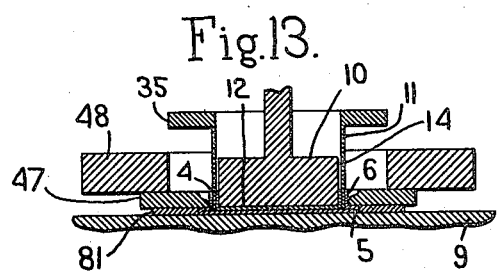
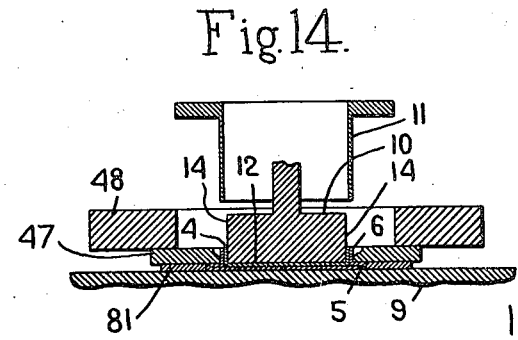

UNITED STATES PATENT OFFICE.

FRANK ZALESKI, OF BOSTON, MASSACHUSETTS, ASSIGNOR TO REECE SHOE MACHINERY COMPANY, OF BOSTON, MASSACHUSETTS, A CORPORATION OF MAINE.

MACHINE FOR MAKING COMPOSITE INSOLES.

1,265,579.           Specification of Letters Patent.      Patented May 7, 1918.

Application filed June 21, 1917. Serial No. 176,222.

*To all whom it may concern:*

Be it known that I, FRANK ZALESKI, a subject of the Emperor of Germany, residing at Boston, county of Suffolk, State of Massachusetts, have invented an Improvement in Machines for Making Composite Insoles, of which the following description, in connection with the accompanying drawing, is a specification, like characters on the drawing representing like parts.

This invention relates to a machine for making composite insoles of that type comprising two superposed layers of sheet material, one of which has its marginal edge upturned to form a lip, and the other of which is larger than the first-named sheet and has the marginal portion thereof that is situated outside of the first-named layer folded back on itself to form the feather edge of the insole, the peripheral edge of said marginal portion being upturned to overlie the upturned portion of the first-named layer and form with it the inseam-receiving rib of the insole. An insole having substantially this construction is illustrated in United States Patent No. 1,062,536, dated May 20, 1913, and No. 1,206,927, dated December 5, 1916.

As a matter of convenience and to simplify the description, I will refer to the first-named layer which has the upturned lip as the inner member, and the second layer from which the feather edge of the insole is made as the outer member.

In making a composite insole having these inner and outer members, it is necessary to upturn the marginal edge of the blank from which the inner member is formed; to fold the outer member in such a way that the marginal edge of the outer member will be folded back on itself to form the feather edge of the insole and the peripheral edge of said marginal portion will be bent upwardly to form a lip, and to assemble the two members.

It is the object of the present invention to provide a novel machine for making composite insoles of this nature in which the two blanks from which the inner and outer members are formed are formed into the proper shape and are assembled in the form of a complete insole, all with one operation.

In order to give an understanding of my invention, I have illustrated in the drawings a selected embodiment thereof which will now be described, after which the novel features will be pointed out in the appended claims.

In the drawings, Figure 1 is an end view partly in vertical section of a machine embodying my invention;

Fig. 6 is a perspective view of an insole such as would be produced by the herein-described machine;

Fig. 7 is a sectional perspective view through said insole;

Fig. 8 shows the blank from which the inner member is formed;

Fig. 9 shows the blank from which the outer member is formed;

Figs. 10, 11, 12, 13 and 14 are diagrammatic views showing various steps in the operation of making an insole with my improved machine.

Figure 1:
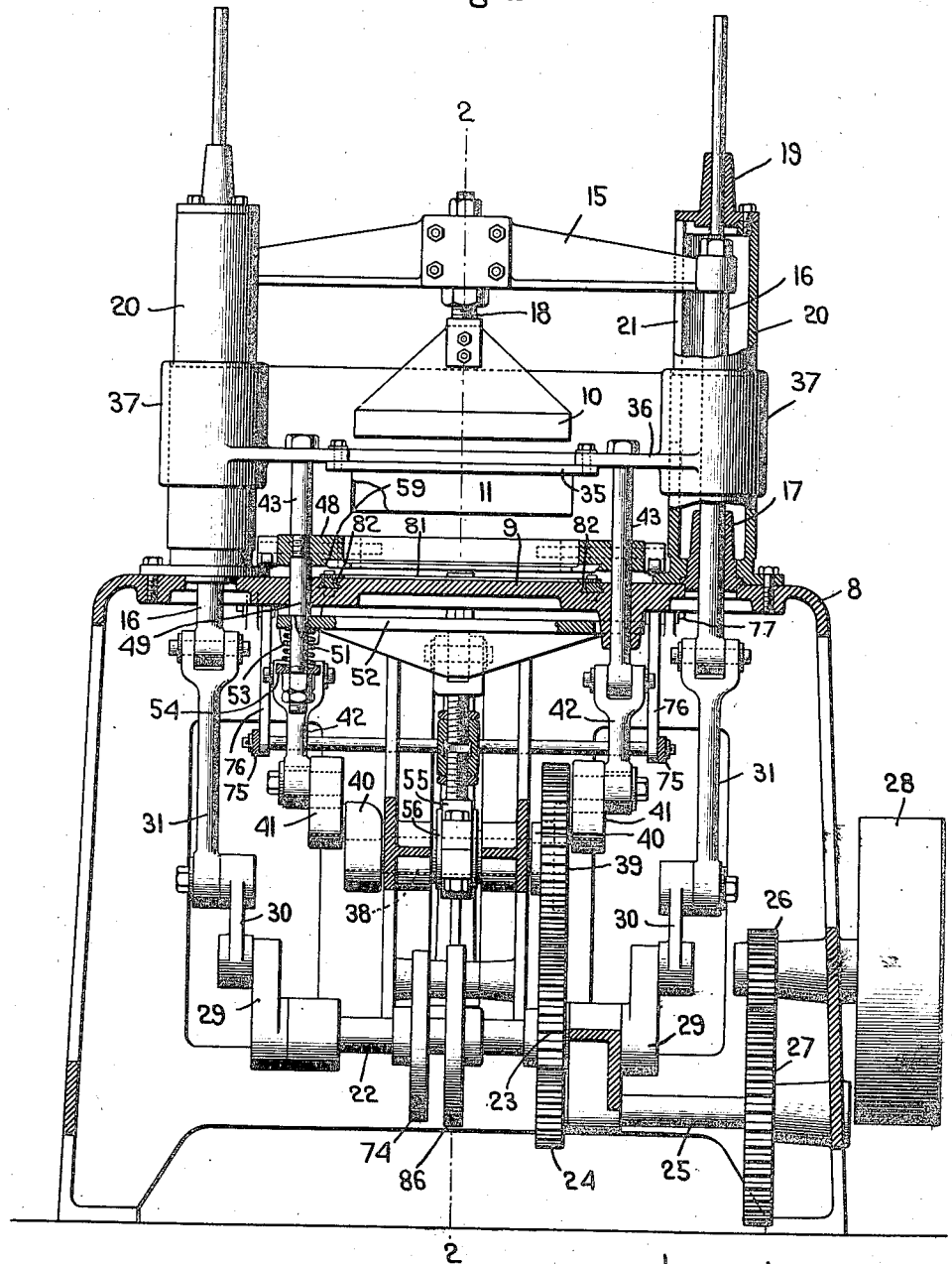

Before describing the machine, I will refer briefly to the composite insole which is made thereon. This insole is shown in Figs. 6 and 7 and comprises the two layers 1 and 2 of sheet material, such, for instance, as thin leather, canvas, etc., the layer 1 for convenience being referred to as the inner member, and the layer 2 as the outer member. The inner member is made from a blank 3 such as shown in Fig. 8 and is produced by upturning the marginal edge portion of said blank 3 thereby to form the lip 4. The outer member 2 is formed from a blank 7 which is larger than the blank 3 and is produced by folding the marginal portion of said blank backwardly on itself thereby to form the edge portion 5 of the insole and by turning up the peripheral edge of the infolded portion to form a lip 6 which surrounds and overlies the lip 4 of the inner member. When the inner and outer members are assembled, the folded-over portion 5 of the outer member constitutes the feather edge of the insole, while the two overlying upturned lips 4 and 6 constitute the inseam-receiving rib 50 of the insole.

As stated above, my present invention aims to provide a machine by which the two blanks 3 and 7 may be properly folded and shaped in the manner above described and assembled to produce a complete insole all at one operation.

The essential elements of the machine by which this is accomplished comprise a bed plate, two die members having a telescopic relation and by the coöperation of which the peripheral edge of the inner member is upturned, and folding blades which coöperate with the two die members and the bed plate to fold the outer member and assemble the two members.

The folding of the outer member is accomplished by first upturning the marginal portion thereof against the side of one of the die members and then bringing the folding blades into engagement with the upturned portion of said blank at a point adjacent but separated from the peripheral edge thereof, and then moving said folding blades relative to the die member thereby to form an outwardly-extending fold in that part of the upturned portion of the outer member immediately circumjacent the portion thereof which has not been upturned. These various elements are shown as properly supported on a suitable frame 8 which comprises in its construction the bed plate 9. The two dies which have a telescopic relation and by which the inner member 1 is given its proper shape are indicated at 10 and 11, respectively. The die member 10 has a shape corresponding to the contour of the inseam-receiving rib 50 of the insole, and has a size fitting the interior face of the rib. This die is formed with a flat under face 12 and with the side walls 14 which constitute a lip-forming portion thereof. The other die which coöperates with the die member 10 for forming the inner member is indicated at 11. It is a hollow die member having relatively-thin walls and having both an interior and exterior shape corresponding to that of the die member 10. The size of the die member 11 interiorly is such as to freely receive the die member 10, and the two die members are mounted for movement relative to each other to permit the die member 10 to be inserted into the die member 11. When the machine is at rest, the two die members 10 and 11 are separated, as shown in Fig. 10, to permit the blank 3 to be inserted between them, said blank resting on the die member 11. After the blank is thus positioned, the two die members are moved relative to each other to cause the die member 10 to be forced into the die member 11, this operation resulting in upturning the marginal portion of the blank 3 to form the turned-up lip 4. The two die members 10 and 11 may be supported and operated in any suitable way to produce the above relative movement. I have herein shown the die member 10 as secured to a cross-head 15 which is mounted on two plungers 16 operating in suitable guides or bearings. The die 10 is shown as adjustably secured to the cross-head 15 by means of the screw 18. The bearings for each plunger 16 comprise a lower bearing 17 and an upper bearing 19, the upper bearing being sustained by a tubular guiding member 20 within which the plunger is located and which is secured to the frame 8. Each of the tubular members 20 is slotted at 21 to permit movement of the cross-head 15. The plungers 16 are connected to and driven from a shaft 22 which is suitably journaled in the frame and which may be operated from any suitable source of power. As herein shown, this shaft 22 has a gear 23 thereon which meshes with and is driven by a pinion 24 on a countershaft 25, said countershaft 25 being driven by suitable gearing 26, 27 from a shaft having a driving pulley 28 thereon. The shaft 22 is provided at each end with a crank 29 which is pivotally connected to one end of a relatively-short link 30, the other end of said link being pivotally connected to a link 31 which in turn is pivoted to the lower end of the corresponding plunger 16. Each link 30 has an arm 32 rigid therewith to which is pivotally connected one end of a guiding link 33, the other end of said link being pivoted to the frame at 34. With this arrangement the rotation of the shaft 22 will give the plungers 16 and cross-head 15 an up-and-down movement, thereby giving vertical reciprocation to the die member 10.

The die member 11 is shown as provided at its upper end with a laterally-extending flange 35 by which it is secured to a carrier 36 that is provided with hubs or guiding sleeves 37 that encircle the tubular guide members 20 and are adapted to slide vertically thereon. This carrier 36 is also vertically movable and its vertical movement is derived from a shaft 38 journaled in the frame and operated in timed relation with the shaft 22. For this purpose the shaft 38 is provided with a gear 39 thereon which meshes with and is driven by the gear 23. The shaft 38 is provided at each end with a crank 40 to which is pivotally connected the lower end of a link 41, each link 41 being in turn pivotally connected to the lower end of a link 42, and each link 42 being pivotally connected at its upper end to a vertically-moving rod 43 which extends through and is guided in an aperture in the bed plate. The upper ends of the rods 43 are secured to the carrier 36 so that rotation of the shaft 38 will operate through the cranks 40 to reciprocate in a vertical direction the carrier 36 and the die member 11 carried thereby. The links 41 each have an extension 44 which is pivotally connected to one end of a guiding link 45, the other end of each link 45 being pivoted to the frame, as shown at 46.

As stated above, the folding of the outer member 2 is accomplished by the coöperation of the combined dies 10 and 11, the bed plate 9 and a folding element which has an edge contour corresponding to that of the outside of the inseam-receiving rib 50. This folding element is preferably composed of a plurality of folding blades that are mounted for movement toward and from the bed and are also capable of movement toward and from each other. I have shown herein two such folding blades 47, each having an edge contour corresponding to one-half the contour of the inseam-receiving rib, but the folding element may be divided into more than two blades or sections if desired. These blades 47 are shown as sustained on the underside of a carriage 48, which carriage is mounted for vertical movement. The carriage is a skeleton carriage with a central opening therein of a size larger than the die 11. The carriage has secured to and depending therefrom a plurality of posts or rods 49 which extend through and are guided in the bed plate 9, the lower end of each rod being reduced in diameter to form a shoulder 51 and extending through a cross-head 52. A spring 53 surrounds the reduced portion of each post 49 and is situated between the cross-head 52 and a follower 54 adjustably secured on the rod. The cross-head 52 is adjustably connected to an eccentric strap 55 which encircles an eccentric 56 formed on the shaft 38. The rotation of the eccentric will give vertical reciprocation to the cross-head 52, and the latter acting through the springs 53 and posts 49 will reciprocate vertically the carriage 48 with the folding blades 47 thereon, this movement of the carriage being a yielding one due to the springs 53. The contour of the edge 57 of the folding blades 47 corresponds to that of the die member 11, and normally the folding blades are so adjusted that the edge 57 thereof forms an opening into which the die 11 can be inserted.

The operation of the device as thus far described can be best understood by reference to Figs. 10 to 14. When the machine is at rest, the parts are in the relative position shown in Figs. 1 and 10, the folding blades 47 being situated above and separated from the bed plate 9, the die member 11 being situated above and separated from the carriage 48 that supports the folding blades, and the die member 10 being situated above the carriage 36 that supports the die member 11. With the parts in this position a blank 3 is placed on the supporting flange 35 of the die member 11, as shown in Fig. 10, and a blank 7 is placed on the folding blades 47. When the machine is started in operation, the die members 10 and 11 are first given a movement relative to each other to force the die member 10 into the member 11, thereby turning up the edge portion of the blank 3 to form the lip 4. This operation carries the two die members into the relative position shown in Fig. 11 and brings the under face 12 of the die member 10 flush with the lower edge of the die member 11. With the construction shown, this relative movement of the die members 10 and 11 occurs while both members are moving downwardly, the operating means for the die members being such that the die member 10 moves faster than the die member 11 and thus is brought into the relative position shown in Fig. 11 before the die member 11 completes its downward stroke. When the die members 10 and 11 have been brought substantially into the position shown in Fig. 11, then the two die members engage the blank 7 and force the latter down through the folding blades against the bed plate 9, as shown in Fig. 12, this operation resulting in turning up the marginal portion 58 of the blank 7 against the outer face of the die 11, this outer face constituting a lip-forming portion. When the parts have been brought to the position shown in Fig. 12, the folding blades 47 are moved inwardly slightly to press the upfolded portion 58 of the blank 7 firmly against the lip-forming face of the die 11, and then said blades are moved downwardly toward the bed plate into the position shown in Fig. 13, and by their engagement with the upturned portion 58 of the blank 7 they force the upfolded portion 58 downwardly relative to the die 11, thus forming an outwardly-extending fold 5 in that part of the upturned portion 58 which is immediately circumjacent the central portion of the blank 7, that has not been upturned, or, in other words, in that part of the upturned portion 58 which is adjacent to the bed plate. The peripheral edge portion of the upturned portion 58 remains in upright position against the outer face of the die member 11, thus forming the upturned lip 6 of the outer member.

After the operation has been carried to this point, the die member 11 is raised or withdrawn from between the two upturned lips 4 and 6, as shown in Fig. 14, and the folding blades 47 are then given an inward movement to press the lips 4 and 6 firmly together against the lip forming wall 14 of the die 10. This completes the operation of the insole and the parts are then restored to the position shown in Figs. 1 and 10.

Figure 2:
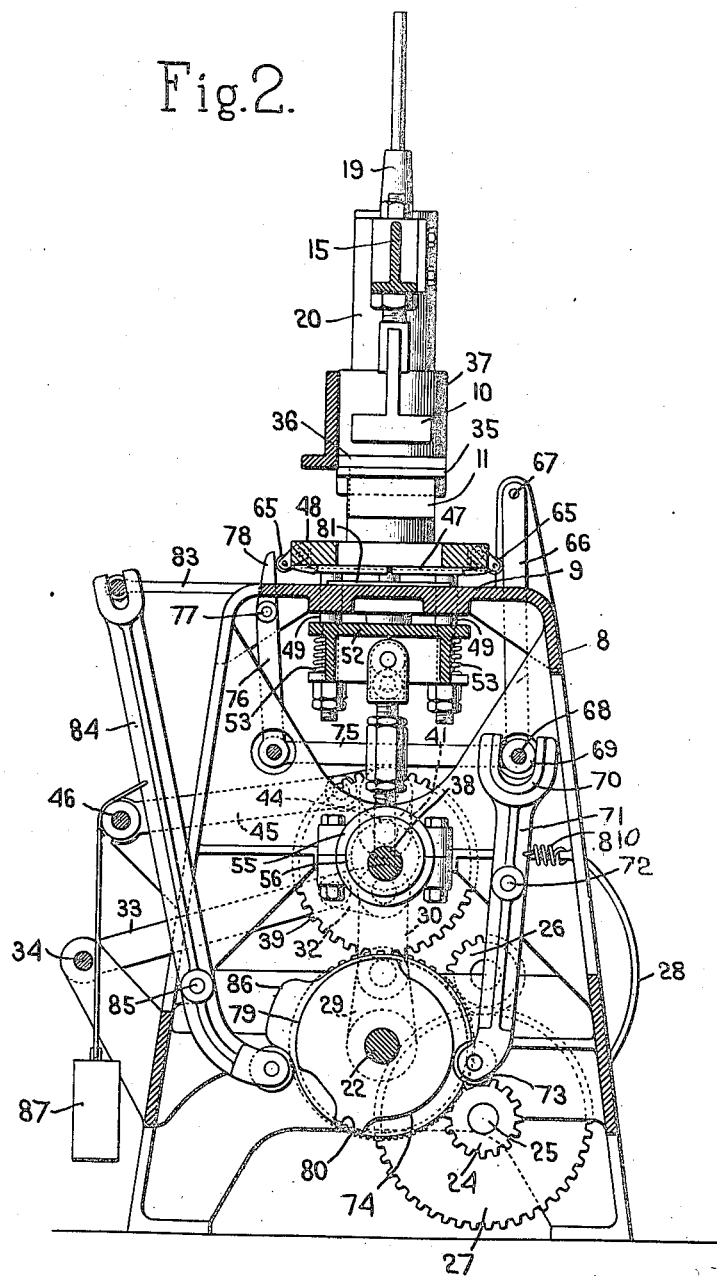
Fig. 2 is a section taken on substantially the line 2—2, Fig. 1.
Figure 3:
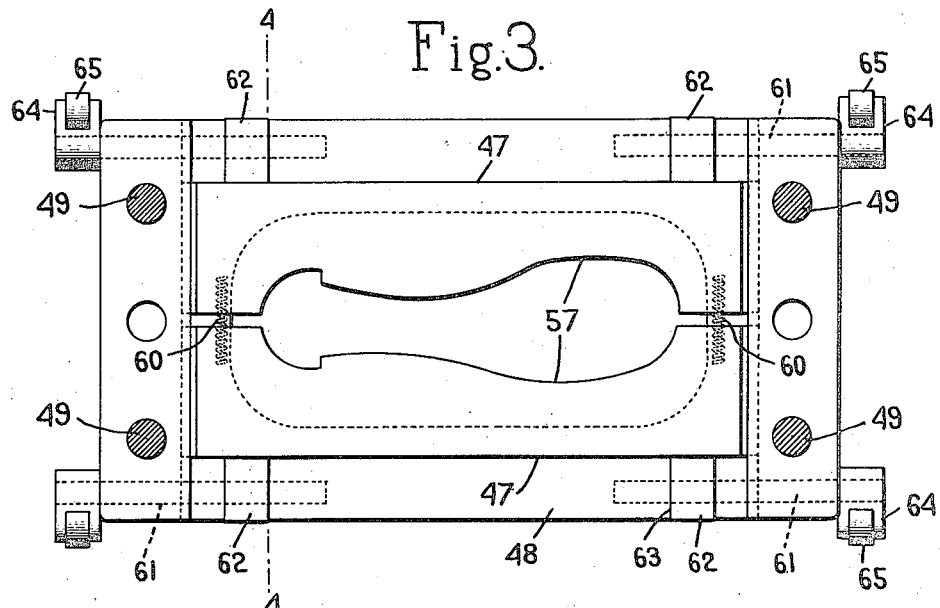
Fig. 3 is a bottom plan view of the folding blades that form the fold in the outer member constituting the feather edge of the insole.
Figure 4:
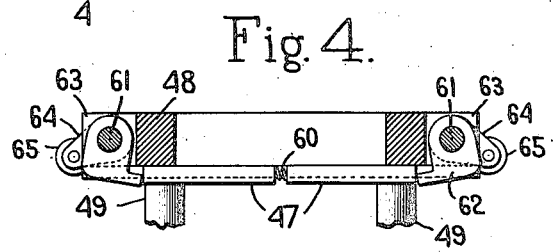
Fig. 4 is a section on the line 4—4, Fig. 3.
Figure 5:
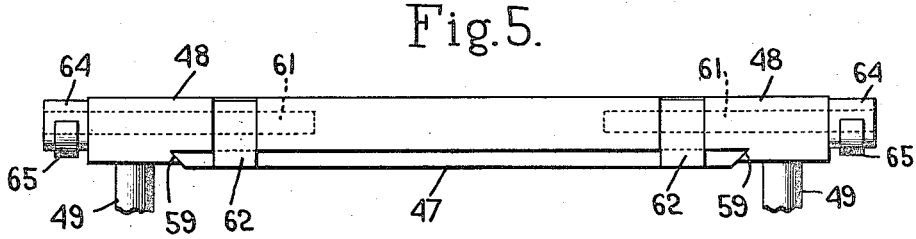
Fig. 5 is a side view of Fig. 3.

Any suitable means may be employed for giving the folding blades 47 their inward movement. I have herein shown said blades as slidably mounted in ways 59 formed in the carriage 48 so that said blades can be moved toward and from each other. The blades are normally separated by means of springs 60 which are interposed between them. The carriage 48 has journaled in each side thereof a pair of rock-shafts 61, and each rock-shaft has fast thereon an arm 62 which occupies a slot 63 formed in the carriage. These arms 62 are constructed to engage the outer edges of the folding blades 47. Each rock-shaft 61 has also fast thereon an arm 64 carrying a roll 65. The rolls on the arms on one side of the carriage engage levers 66 which are pivoted at their upper ends to the frame, as shown at 67. The lower ends of the two levers 66, are connected by a rod 68 which has thereon a roll 69 operating in a fork 70 on the upper end of a lever 71 that is pivoted intermediate of its ends to the frame, as shown at 72. The lower end of the lever has a roll 73 thereon which engages a face cam 74. The lower ends of the levers 66 are also connected by links 75 with the lower ends of other levers 76 which are pivoted to the frame at 77. The upper ends 78 of the levers 77 engage the rolls 65 of the rock-shafts on the opposite side of the carriage 48. With this construction it will be seen that movement of the forked end 70 of the lever 71 to the left, Fig. 2, will operate to force the folding blades toward each other, while movement of the upper end of the lever 71 to the right, Fig. 2, will allow the blades to be separated by the action of the springs 60.

The cam 74 is provided with two high portions 79 and 80, the high portion 79 having a greater extent than the high portion 80. The cam 74 is so timed that the high portion 79 thereof will engage the roll 73, thus moving the folding blades toward each other just after the marginal edge portion 58 of the blank 7 has been upfolded against the die member 11, and the high portion 79 is of sufficient extent to maintain the blades in their inward position while the edge portion 5 is being folded. When the edge portion has been folded, then the high portion 79 passes off from the roll 73, thus relieving the pressure on the folding blades, and at this time the die member 11 is moved upwardly into the position shown in Fig. 14. The high portion 80 then engages the roll 73 and the blades are given another inward movement to press the two upturned edges 4 and 6 together. The high portion 80 is designed to give the lever 71 a greater throw than the high portion 79, thus causing the folding blades to firmly press the two upturned edges 4 and 6 together. The lever 71 is acted on by a spring 810 which maintains the roll 73 in engagement with the low portion of the cam.

I have also provided herein means for ejecting the insole from the machine as soon as it is completed. The bed plate 9 has a gage member 81 slidably mounted thereon which has a shape corresponding to the peripheral shape of the completed insole and which constitutes a shape-giving member for insuring that the periphery of the folded portion 5 shall have its proper shape as it is folded. This gage member 81 is mounted upon slides 82 that are slidably mounted in the bed plate, and it has an arm 83 extending therefrom which is pivotally connected to the upper end of the lever 84 that is pivoted to the frame at 85. The lower end of the lever is adapted to be acted upon by a cam 86 fast on the shaft 22, said cam operating to rock the lever and thus move the gage member to the right, Fig. 2, just when the insole has been completed and the parts restored to their normal position. This movement ejects the completed insole from the machine. The lever 84 is shown as having a weight 87 connected thereto which returns the gage to normal position.

One advantage of the double link connection between the cranks 29 and the plungers 16 and also between the cranks 40 and the rods 43 is that a greater dwell is secured at the lower limit of the stroke than would result if an ordinary crank motion were used. The actuating mechanism shown is designed so that it will give the dies 10 and 11 the requisite relative movement to cause the die 10 first to move into the die 11 and then to cause both dies to move together into the position shown in Fig. 12, and afterward to retract the die 11, as shown in Fig. 14, before the die 10 is retracted.

While I have illustrated herein a selected embodiment of my invention, I do not wish to be limited to the constructional features shown.

I claim:

1. In a machine for making composite insoles, the combination with means to upturn the marginal portion of a blank of sheet material, of means to form in said upturned portion an outwardly-extending fold constituting the feather edge of the insole.

2. In a machine for making composite insoles, the combination with means to upturn the marginal portion of a blank of sheet material, of means to form in the part of said upturned portion immediately circumjacent the portion of the blank which has not been upturned, an outwardly-extending fold which constitutes the feather-edge of the insole.

3. In a machine for making composite insoles, the combination with means to upturn the marginal portion of a blank of sheet material, of means to form in the part of said upturned portion immediately circumjacent the portion of the blank which has not been upturned, an outwardly-extending fold which constitutes the feather edge of the insole while retaining the peripheral edge of the upturned portion in its upturned position to constitute a lip.

4. In a machine for making composite insoles, the combination with folding blades, of a die member coöperating with said blades to upturn the marginal portion of a blank of sheet material against the side of said die member, and means to move the folding blades relative to the die member thereby to form in the upturned portion an outwardly-extending fold constituting the feather edge of the insole.

5. In a machine for forming composite insoles, the combination with folding blades, of a die member coöperating with said blades to upturn the marginal portion of a blank of sheet material against the side of the die member, means to cause said folding blades to press said marginal portion against the side of said die member and then to move relative to the die member, thereby to form an outwardly-extending fold in said marginal portion.

6. In a machine for making composite insoles, the combination with a bed plate, of folding blades, a die member, means to move the die member relative to the folding blades and bed plate, thereby to upturn the marginal portion of a blank of sheet material against the side of the die member and to press the body of said blank against the bed plate, and means to move said folding blades relative to the die member and bed plate thereby to form in the upturned marginal portion an outwardly-extending fold constituting the feather edge of the insole.

7. In a machine for making composite insoles, the combination with a bed plate, of folding blades, a die member, means to move the die member relative to the folding blades and bed plate, thereby to upturn the marginal portion of a blank of sheet material against the side of the die member and to press the body of said blank against the bed plate, and means to move said folding blades relative to the die member and bed plate thereby to form in the upturned marginal portion an outwardly-extending fold constituting the feather edge of the insole while retaining the peripheral edge of said marginal portion in its upturned position to constitute a lip.

8. In a machine for making composite insoles, the combination with a bed plate, of folding blades, a die member, means to move the die member relative to the folding blades and bed plate, thereby to upturn the marginal portion of a blank of sheet material against the side of a die member and press the body of the said blank against the bed plate, means to move the folding blades toward the die member to cause them to press the upturned marginal portion against the side of the die member, and means to move said blades toward the bed plate, thereby to form in said upturned portion an outwordly-extending fold constituting the feather edge of the insole.

9. In a machine for making composite insoles, the combination with folding blades presenting between them an opening having a shape corresponding to that of the inseam-receiving rib of an insole, of a die-member, means to move said die member through said opening thereby to upturn a marginal portion of a blank against the sides of the die, and means to move the folding blades relative to the die thereby to form in said upturned marginal portion an outwardly-extending fold constituting the feather edge of the insole.

10. In a machine for making composite insoles, the combination with folding blades presenting between them an opening having a shape corresponding to that of the inseam-receiving rib of an insole, of a die member, means to move said die member through said opening thereby to upturn the marginal portion of a blank against the sides of the die, and means to cause said blades to grip the upturned marginal portion against the sides of the die and then to move in a direction parallel to said sides thereby to form in said marginal portion an outwardly-extending fold which constitutes the feather edge of the insole.

11. In a machine for making composite insoles, the combination with a bed plate, of folding blades situated above the bed plate and presenting between them an opening having a shape corresponding to that of the inseam-receiving rib of an insole, a die member above the folding blades, means to move the die member through said opening thereby to upturn the marginal portion of a blank against the sides of the die and to press the central portion of said blank against the bed plate, and means to move the folding blades and bed plate relative to each other thereby to form in said upturned portion an outwardly-extending fold which is pressed between the bed plate and folding blades and constitutes the feather edge of the insole.

12. In a machine for making composite insoles, the combination with a bed plate, of folding blades situated above the bed plate and presenting between them an opening having a shape corresponding to that of the inseam-receiving rib of an insole, a die member situated above the folding blades, means to move the die member through the folding blades thereby to upturn the marginal portion of a blank against the sides of the die and to press the body of the blank against the bed plate, means to move the folding blades inwardly to press the upturned portion of said blank against the sides of the die, and means to move the blades toward the bed plate thereby to form an outwardly-extending fold in that part of the upturned portion between the bed plate and folding blades.

13. In a machine for making composite insoles from two blanks of sheet material, the combination with means to upturn the marginal edge portion of one blank, of means to superpose said blank on the other blank and to upturn the marginal portion of said other blank around the upturned portion of the first-named blank, and means to form in said upturned portion of the second blank an outwardly-extending fold constituting the feather edge of the insole.

14. In a machine for making composite insoles from two blanks of sheet material, the combination with means to upturn the marginal edge portion of one blank, of means to superpose said blank on the other blank and to upturn the marginal portion of said other blank around the upturned portion of the first-named blank, and means to form in said upturned portion of the second blank an outwardly-extending fold constituting the feather edge of the insole while maintaining the peripheral edge of said second blank in upturned position surrounding the upturned edge of the first-named blank.

15. In a machine for making composite insoles, the combination with a bed plate, of folding blades situated above the bed plate, two die members, one adapted to be inserted into the other, means to move said die members relatively to each other and to the folding blades and bed plate, thereby to upturn the marginal portion of a blank of sheet material placed between said die members and also to upturn the marginal portion of a second blank of sheet material against the outer die member and to press both blanks against the bed plate, and means to move the folding blades relative to the bed plate to form in the marginal portion of the second blank an outwardly-extending fold constituting the feather edge of the insole.

16. In a machine for making composite insoles, the combination with a bed plate, of folding blades situated above the bed plate, two die members, one adapted to be inserted into the other, means to move said die members relatively to each other and to the folding blades and bed plate, thereby to upturn the marginal portion of a blank of sheet material placed between said die members, and also to upturn the marginal portion of a second blank of sheet material against the outer die member and to press both blanks against the bed plate, and means to move the folding blades relative to the bed plate to form in the marginal portion of the second blank an outwardly-extending fold constituting the feather edge of the insole while retaining the peripheral edge of said second blank in upturned position and to press together the upturned edges of the two blanks.

17. In a machine for making composite insoles, the combination with a bed plate, of folding blades situated above the bed plate and presenting between them an opening having a shape corresponding to that of the inseam-receiving rib of an insole, an annular die member above the folding blades, and a second die member adapted to be inserted into the annular member.

18. In a machine for making composite insoles, the combination with a bed plate, of folding blades situated above the bed plate and presenting between them an opening having a shape corresponding to that of the inseam-receiving rib of an insole, an annular die member above the folding blades and having a similar shape, a second die member adapted to be inserted into the annular member, means to move the die members relative to each other thereby to upturn the marginal edge of a blank of sheet material against the side of the last-named die member and to move both die members through the opening of the folding blades thereby to upturn the marginal portion of a second blank of sheet material against the outer side of the annular die member and to press both blanks against the bed plate, and means to move the folding blades relative to the bed plate and annular die member thereby to form in the upturned portion of said second blank an outwardly-extending fold constituting the feather edge of the insole.

19. In a machine for making composite insoles, the combination with a bed plate, of folding blades situated above the bed plate and presenting between them an opening having a shape corresponding to that of the inseam-receiving rib of an insole, an annular die member above the folding blades and having a similar shape, a second die member adapted to be inserted into the annular member, means to move the die members relative to each other thereby to upturn the marginal edge of a blank of sheet material against the side of the last-named die member and to move both die members through the opening of the folding blades thereby to upturn the marginal portion of a second blank of sheet material against the outer side of the annular die member and to press both blanks against the bed plate, means to move the folding blades relative to the bed plate and annular die member thereby to form in the upturned portion of said second blank an outwardly-extending fold constituting the feather edge of the insole while retaining the peripheral edge of said second blank in upturned position, means to withdraw said annular die member from between the upturned edges, and means to press said upturned edges together thereby to form the inseam-receiving rib of the insole.

20. In a machine for making composite insoles, the combination with a bed plate, of folding blades situated above the bed plate and presenting between them an opening having a shape corresponding to that of the inseam-receiving rib of an insole, an annular die member above the folding blades and having a similar shape, a second die member adapted to be inserted into the annular member, means to move the die members relative to each other thereby to upturn the marginal edge of a blank of sheet material against the side of the last-named die member and to move both die members through the opening of the folding blades thereby to upturn the marginal portion of a second blank of sheet material against the outer side of the annular die member and to press both blanks against the bed plate, means to move the folding blades relative to the bed plate and annular die member thereby to form in the upturned portion of said second blank an outwardly-extending fold constituting the feather edge of the insole, and means to eject the completed insole from the machine.

21. In a machine for making composite insoles, the combination with a bed plate 9, of folding blades 47, die members 10 and 11 and mechanism for operating said parts.

In testimony whereof I have signed my name to this specification.

FRANK ZALESKI.